UNITED STATES PATENT OFFICE.

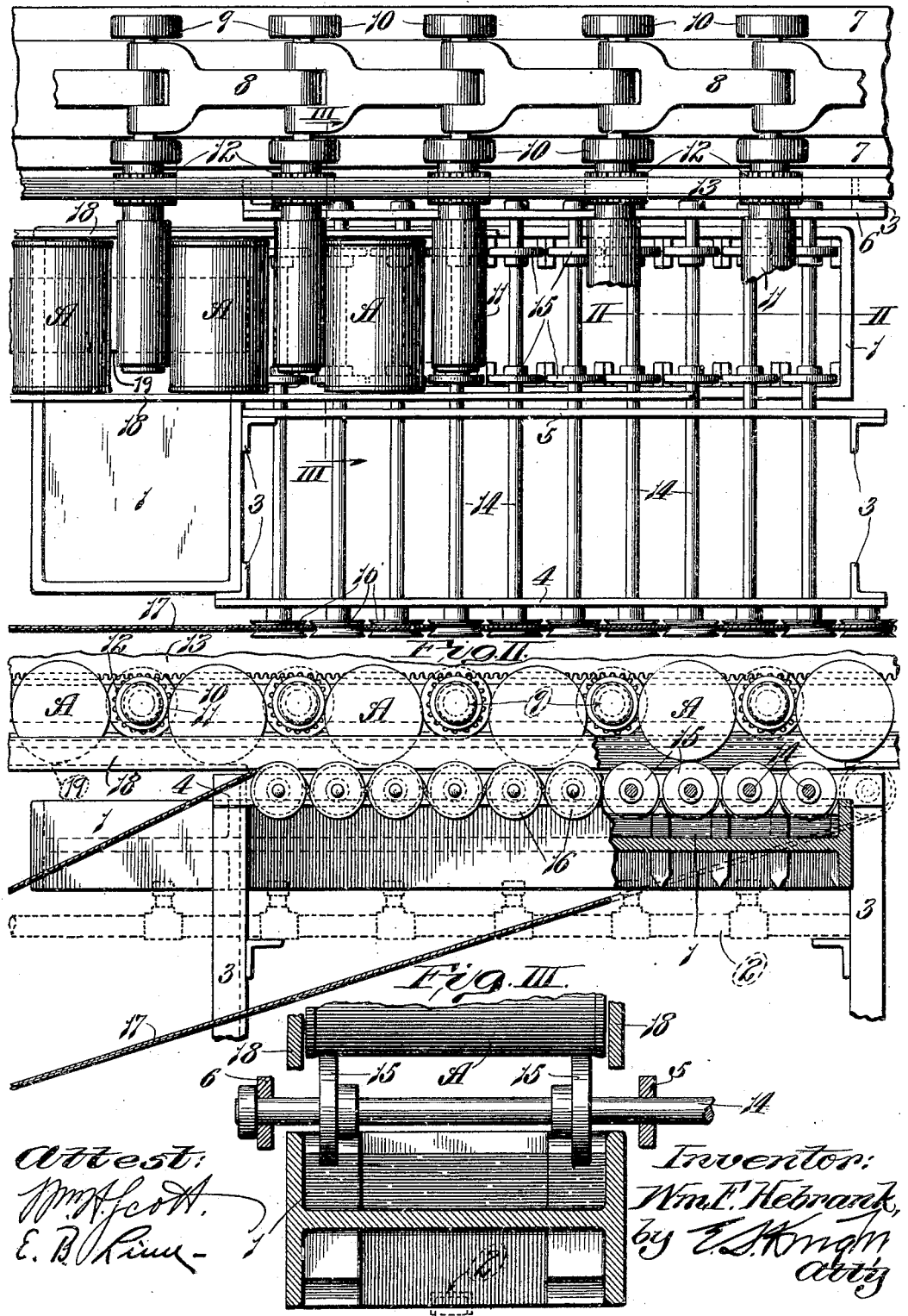

WILLIAM F. HEBRANK, OF HIGHLAND, ILLINOIS.

APPARATUS FOR APPLYING SOLDER TO CANS.

951,502.  Specification of Letters Patent.  Patented Mar. 8, 1910.

Application filed October 14, 1909. Serial No. 522,513.

*To all whom it may concern:*

Be it known that I, WILLIAM F. HEBRANK, a citizen of the United States of America, residing at Highland, in the county of Madison and State of Illinois, have invented certain new and useful Improvements in Apparatus for Applying Solder to Cans, of which the following is a full, clear, and exact description, reference being had to the accompanying drawings, forming part of this specification.

My invention relates to an apparatus for applying solder to sheet metal cans and intended to be used in conjunction with a can soldering machine, the invention having for its object a construction of this description whereby only a uniform amount of solder may be transmitted to the cans from a solder bath while the cans are being conducted over the bath through the medium of a conveyer.

Figure I is a top or plan view of my apparatus. Fig. II is a view partly in side elevation and partly in vertical longitudinal section taken on the line II—II, Fig. I. Fig. III is an enlarged vertical cross section taken on the line III—III, Fig. I.

In the accompanying drawings:—1 designates a tank in which a bath of solder may be kept in a heated condition through the medium of a heater of any desirable description, such for instance as the gas heater indicated in dotted lines at 2, Fig. III.

3, (see Figs. I and II,) are posts located at sides of the solder bath tank and which serve as supports for longitudinal bearing bars 4, 5, and 6, the first two of which are located at one side of the tank, while the other is located at the other side of the tank. These several bearing bars have mounted in them a plurality of shafts that will be hereinafter more particularly referred to.

7 designates double track rails located in proximity to and extending parallel with the outer bearing bar 6. These double track rails serve to support a conveyer chain composed of links 8 connected by shafts 9 that serve as pivot members for the chain links and which have further utility to be hereinafter made clear. The shafts 9 have fitted to them wheels 10 that are operable upon the track rails 7. The shafts 9 extend beyond the track rail 7 nearest the solder bath tank 1 and over said tank, and each shaft serves as a support for a carrier roller 11 that is arranged to revolve as it traverses the tank. Rotation is imparted to the roller 11 through the medium of pinions 12 rigidly associated with the rollers 11 and which are coöperable with the horizontal rack bar 13 surmounting the pinions and having its rack teeth at its under side, as seen in Fig. II.

14 designates shafts which are loosely mounted in the bearing bars 4, 5 and 6. These shafts extend transversely of the apparatus and parallel with the rollers 11 beneath the course of travel of which they are located. Each of the several shafts 14 is provided with a pair of pick-up disks 15 spaced apart from each other and operable in the solder bath in the tank 1, as illustrated most clearly in Figs. II and III, so that they will serve to gather molten solder from the bath in the tank and carry the solder upon their peripheries to apply it to the cans, as will hereinafter more fully appear. Each alternate shaft is intended to be rotated in a direction the reverse of the shaft next adjacent thereto; and to provide for such operation of the shafts, I equip each shaft with a sheave 16 fixed thereto and utilize a drive belt 17 that passes alternately above one sheave and under the next adjacent sheave.

The cans illustrated at A in the drawings are adapted to be conducted through the apparatus between a pair of guide rails 18.

In the practical use of my apparatus, the cans to which solder is to be applied are placed between the rollers 11 carried by the conveyer of the apparatus and so that they will rest initially upon a runway 19 (see full lines Fig. I and dotted lines Fig. II), that leads to a point above one end of the solder tank. As the cans reach the termination of the runway just mentioned, they pass onto the pick-up disks 15, being revolved around their own axes, due to the pressure thereagainst of the rollers 11 and the fact that they ride upon said pick-up disks. During the revolution of the cans, the pick-up disks by rotating in the molten solder transfer solder to the peripheries of the cans at the proper points and adjacent to the ends of the cans at which the heads are located, uniformity of application of the solder being provided for due to the cans traveling through the raceway provided by the guide rails 18. After the cans have traversed the series of pick-up disks by which solder is applied to them, they pass from said disks to any ordinary type of machine in which the completion of the can soldering operation is accomplished.

I claim:—

1. The combination of a solder bath tank, members rotatable in said tank for transferring solder from the tank and applying it to the cans, means for rotating the members alternately in opposite directions, a conveyer, loosely mounted rollers carried by said conveyer and means for rotating said rollers.

2. The combination in a can soldering apparatus, of a solder bath tank, solder pick-up members rotatable in said tank, means for rotating a part of said pick-up members in one direction and the remainder in an opposite direction, a conveyer, rollers carried by said conveyer and rotatable independent thereof, and means for rotating said rollers whereby they are caused to revolve the cans while they are traversing said solder pick-up members.

WILLIAM F. HEBRANK.

In the presence of—
AD. MEYER,
M. A. BARDILL.